May 21, 1940.　　F. W. COTTERMAN　　2,201,848
TRANSMISSION GEARING
Filed July 6, 1936　　5 Sheets—Sheet 1
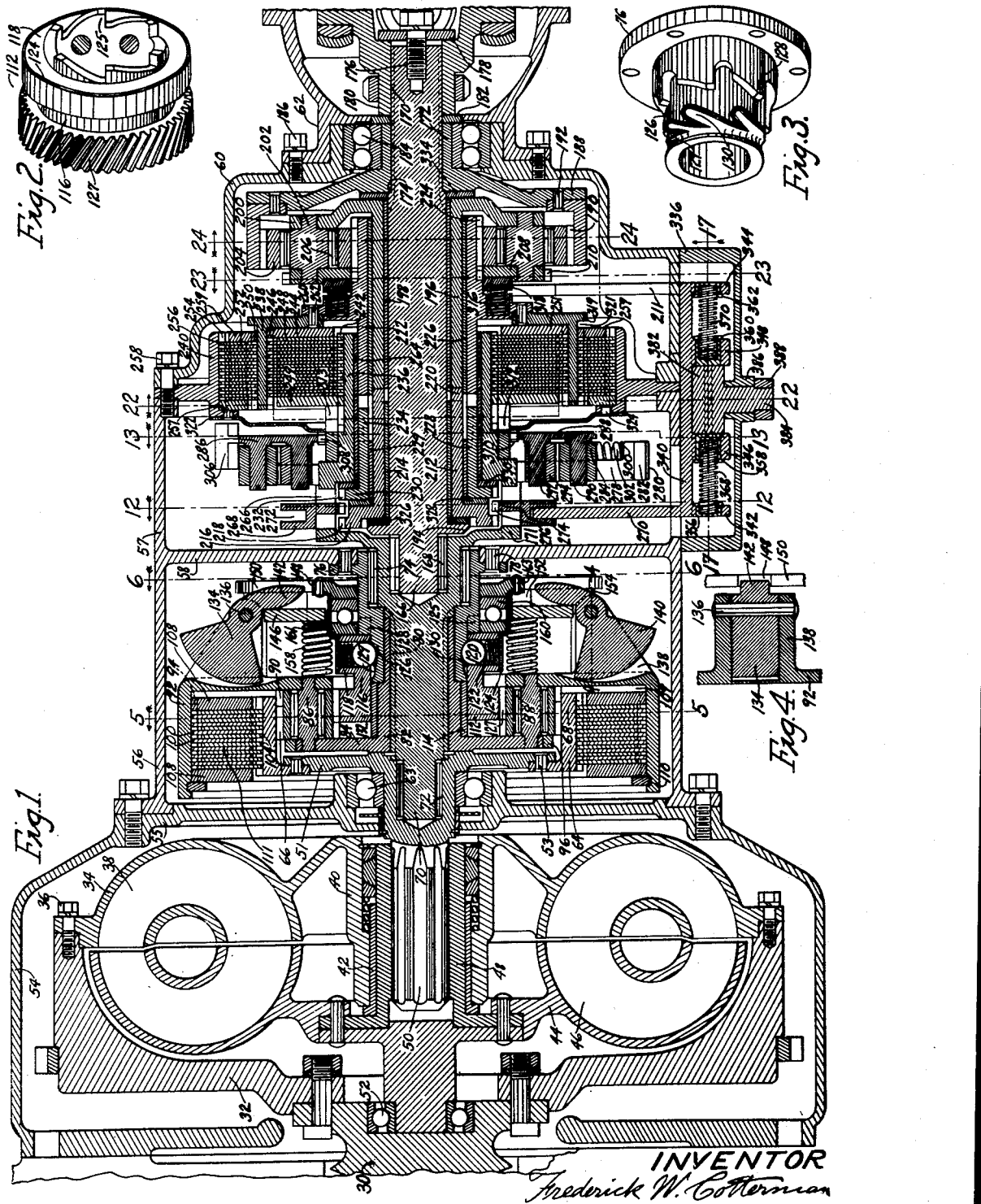
INVENTOR
Frederick W. Cotterman May 21, 1940.　　F. W. COTTERMAN　　2,201,848
TRANSMISSION GEARING
Filed July 6, 1936　　5 Sheets-Sheet 2

INVENTOR
Frederick W. Cotterman

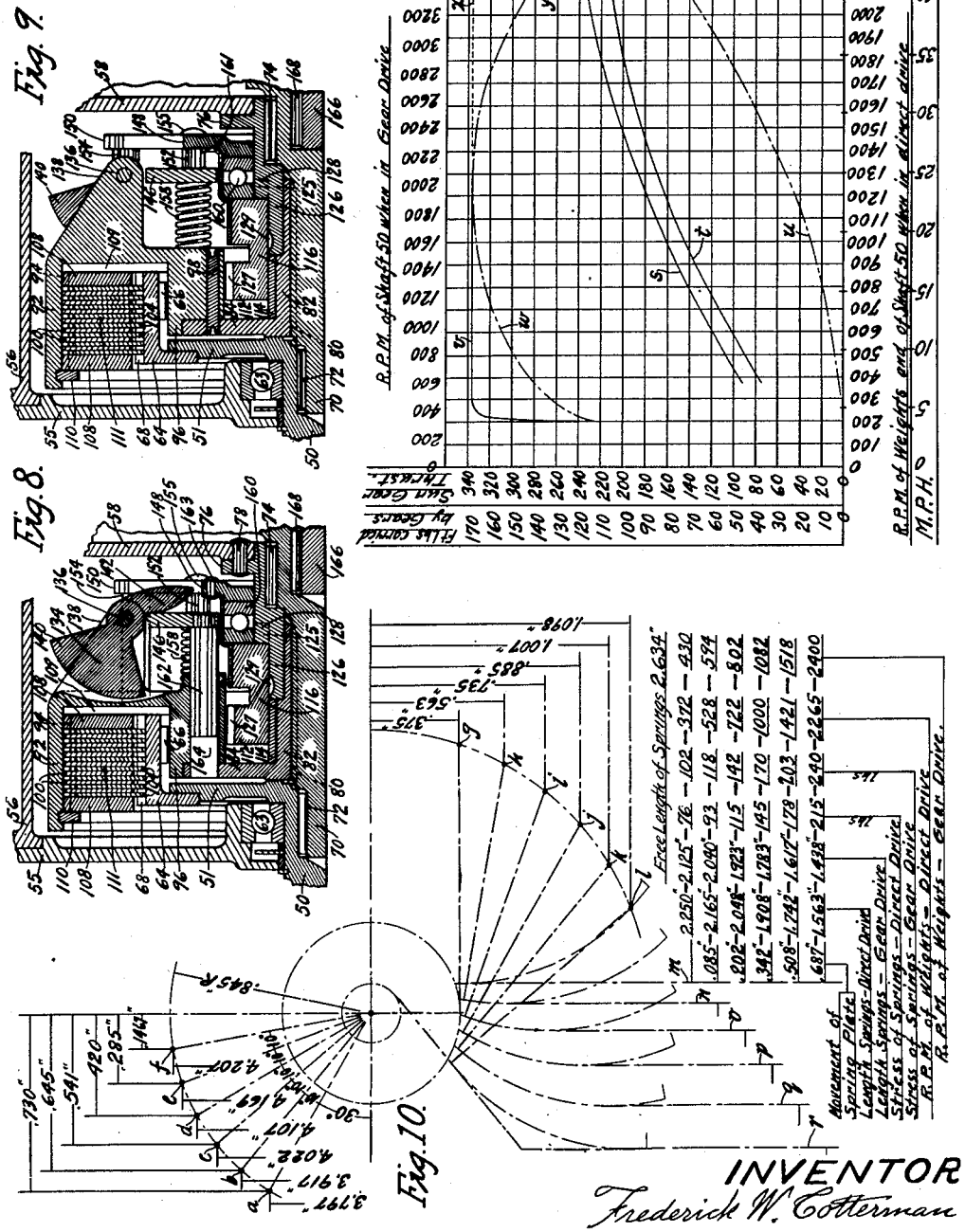

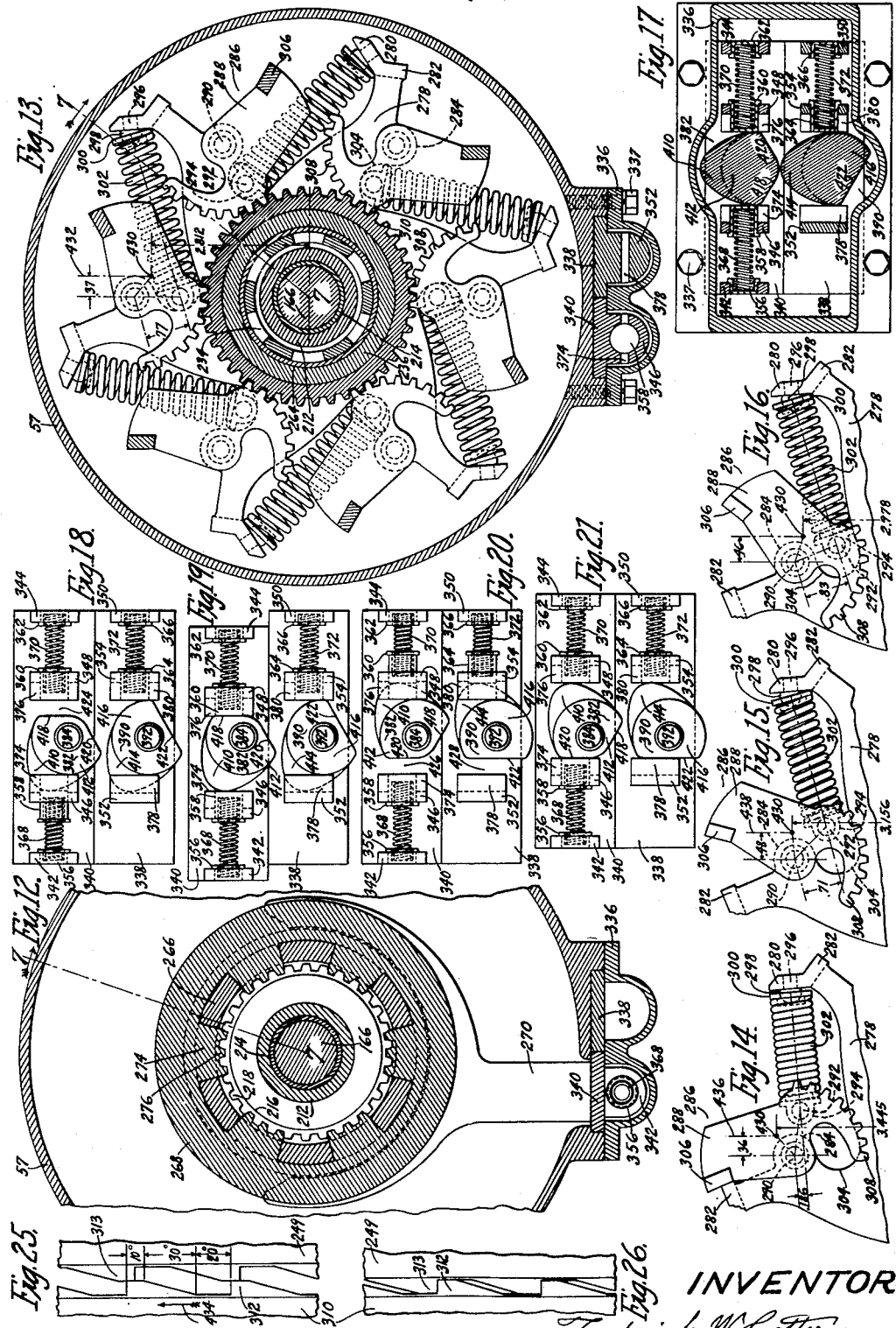

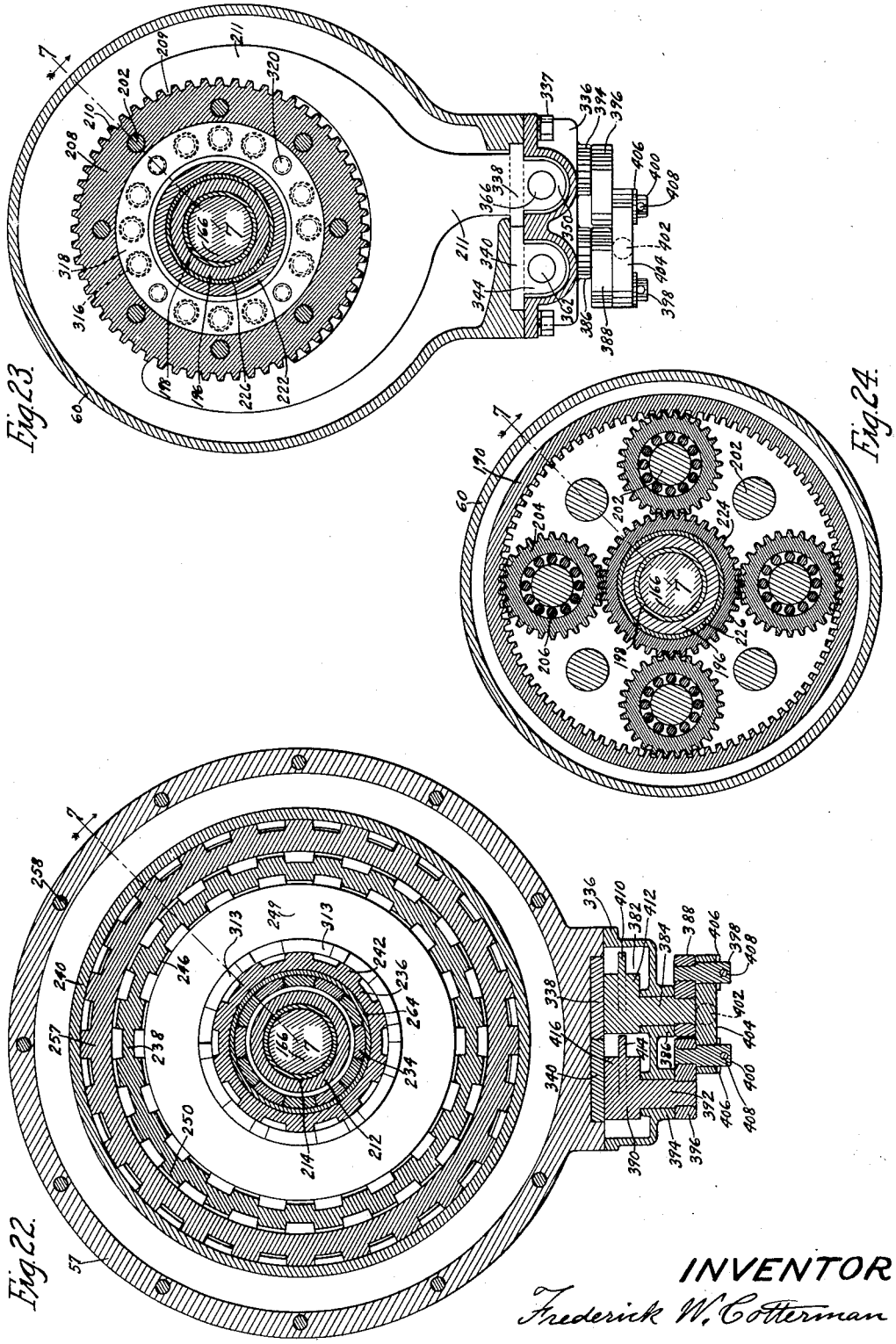

Patented May 21, 1940

2,201,848

UNITED STATES PATENT OFFICE 2,201,848

TRANSMISSION GEARING

Frederick W. Cotterman, Dayton, Ohio, assignor of one-half to Bessie D. Apple, Dayton, Ohio Application July 6, 1936, Serial No. 89,141

24 Claims. (Cl. 74—260)

This invention relates to power transmission mechanism and embodies some of the features of my copending applications Serial Numbers 26,765 and 59,879 filed June 15, 1935, and January 20, 1936, respectively. It is particularly applicable to motor vehicles.

An object of the invention is to provide a transmission mechanism wherein the most used or middle portion of the driving range of a motor vehicle will be effected through direct drive, that is, without the use of any of the gearing in the transmission mechanism.

A second object is to include in the mechanism a single planetary speed reducing gear-set, which may hereinafter be termed the underdrive, which is responsive to speed and torque and which becomes automatically operative when load conditions are such as to either decelerate the vehicle or prevent sufficiently rapid acceleration thereof in direct drive, but which is nevertheless also subject to the will of the operator in that he may, by suddenly changing the amount of applied power by means of the engine throttle, cause the automatic clutch to act and change from gear drive to direct or vice versa as desired.

Another object is to connect the underdrive gear-set to the engine through a fluid coupling, in order that considerably less reduction in speed need be had through the gear-set, to the end that no engine racing will result in bringing the vehicle from a dead stop through the single speed reduction to a desirable speed for direct drive.

Another object is to include in the underdrive gear-set a plate friction clutch automatically engageable to provide direct drive and render the gearing inoperative, and a jaw clutch automatically engageable to provide gear drive whenever the plate clutch is disengaged, to the end that the gearing may remain in constant mesh without including in the mechanism any such device as a roller clutch or a spring clutch both of which have been found to be a source of trouble.

Another object is to provide, in the underdrive gear-set, gearing with helical teeth, so angled that the tangential load carried by the gearing causes an end thrust in a direction proper for disengaging the plate clutch, with means to apply the end thrust to the plate clutch to disengage it and keep it fully disengaged as long as the gearing is transmitting any power.

Another object is to provide a resilient means always operative to urge the plate clutch to become and remain engaged and centrifugal weight means for stressing the resilient means more as the speed increases, the force of the weights being applied to stress the resilient means through a leverage wherein the power arm becomes progressively shorter and the work arm progressively longer as the weight moves farther from its axis of rotation, whereby the stress of the resilient clutch engaging means will increase more nearly as the square root of the R. P. M., instead of as the square of the R. P. M., as is the case where centrifugal means is applied directly or through an unvarying leverage as in common practice, to the end that sufficient clutch engaging pressure may be had at the lower speeds without having too great a clutch engaging pressure at the higher speeds.

Another object is to provide, in a gear mechanism which automatically changes from gear drive to direct drive and vice versa, means for making the change from one drive to the other without a time interval between them, the one drive becoming effective before the other drive lets go, to the end that there will be no time between direct drive and gear drive in which there is no drive, as there is in conventional gear shift transmissions.

Another object is to include in the transmission mechanism a planetary speed increasing gear-set which may hereinafter be designated an overdrive, which may become operative only above a relatively high predetermined speed, to the end that the lesser portion of driving only which is done at very high speeds need be done through this gearing, leaving all normal speeds to be effected without any gearing being operative.

Another object is to provide in connection with the overdrive gearing, such two way driving connections as will insure that the engine is always either driving the vehicle or is being driven thereby, to the end that there will be no overrunning clutches in the mechanism and no free wheeling.

Another object is to provide, in connection with the overdrive gear-set, a direct drive friction clutch normally held engaged by a resilient means, whereby the overdrive gearing is kept inoperative, and centrifugal weights operate to overcome the resilient means to disengage the said clutch to permit said overdrive gears to become operative, with means operated by the thrust of the helical teeth of the gearing to increase the clutch engaging pressure in proportion as the load being carried by the clutch is greater.

Another object is to simplify the overdrive centrifugal mechanism by placing it on the driving member instead of on the driven member as is usual, then providing compensating means in connection with the weights and resilient clutch engaging means, whereby, when the weights are in their "out" position and the resilient means is therefore compressed, the resilient means will exert a much less effort to move the weights inwardly than when the weights are in the "in" position and the resilient means is expanded, to the end that the great decrease in rotative speed of the driving member and weights occurring when the weights move to the "out" position to effect overdrive will not permit the resilient means to return the weights without a still further and greater decrease in speed of the driving member.

Another object is to provide an overdrive friction brake wherein one element is secured to the transmission housing which, upon engagement, holds the sun gear of the overdrive gear-set against rotation whereby the overdrive gear-set becomes operative, the helical teeth of the overdrive sun gear being angled to provide an axial thrust sufficient and in the right direction to hold the said overdrive brake in engagement in proportion to the power being transmitted through said gearing.

Another object is to provide means through which the same overdrive gear-set may be used also as a speed reducing gear-set for reversing the vehicle, to the end that no additional gears need be provided for this purpose.

Another object is to provide a manually operable means operative to three positions to provide forward, neutral and reverse connections between the engine and vehicle wheels, said means being positioned between the underdrive and overdrive gear-sets, and operative when moved to the "forward" and "rearward" positions to engage mating toothed clutching members, there being also a resilient means whereby, when the clutching teeth intended to be engaged are not in alignment, the shift may nevertheless be made without first rotating one of clutching members by engagement with the engine, as in common practice.

Another object is to provide a centrifugal means for operating the overdrive gearing which will insure that when a shift from direct to overdrive or vice versa has once begun to take place the operation will not be interrupted until a complete change from one to the other has occurred.

Another object is to provide in both the underdrive and overdrive mechanisms means for causing the centrifugal weights of a set to all move together to the end that no one weight of a set may move outwardly ahead of the others and cause an unbalanced effect.

That I attain this and many other objects and meritorious features will become apparent as the invention is described in more detail and reference is had to the drawings wherein:

Fig. 1 is a longitudinal, horizontal, axial section through the complete mechanism.

Fig. 2 is a perspective view of the helical sun gear of the underdrive gear-set, showing also the jaw clutch teeth on the end, which, when effective, secure the sun gear against backward rotation.

Fig. 3 is a perspective view of a member which is secured to the housing of the underdrive gear-set and which has jaw clutch teeth which engage the jaw clutch teeth on the sun gear shown in Fig. 2.

Fig. 4 is a fragmentary section taken at 4—4 of Fig. 1 through a hinge pin of one of the centrifugal weights which provide force for stressing the resilient means which maintains underdrive clutch engagement.

Figure 6:
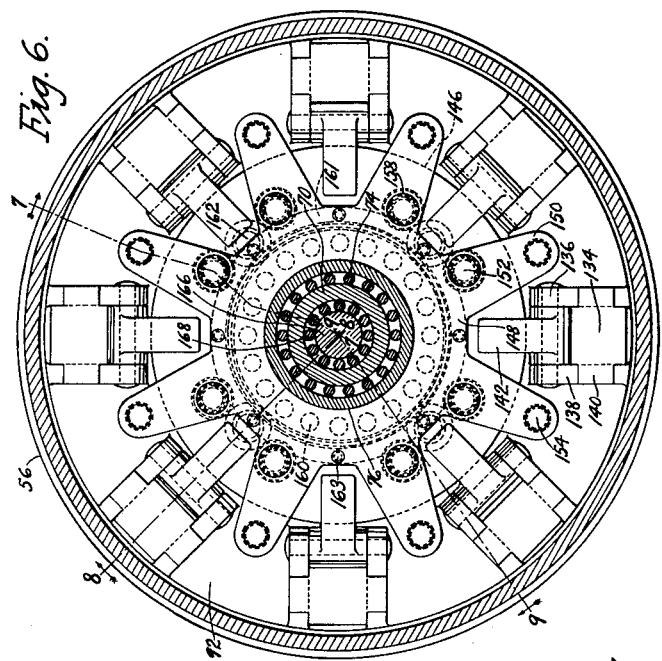
Fig. 6 is a transverse section taken through Fig. 1 at 6—6 showing, largely in end elevation, the centrifugal weights, spring pressure plate and clutch engaging spider through which the weights act to operate the underdrive clutch.
Figure 7:
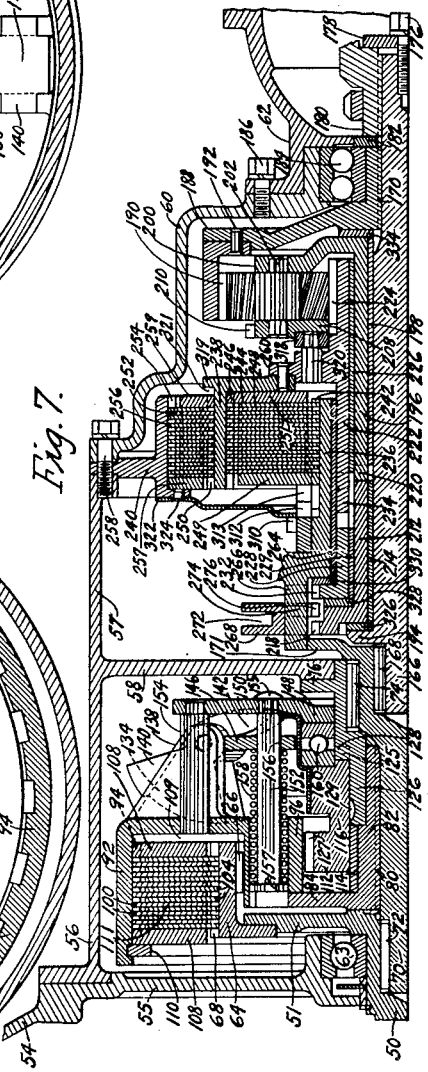

Fig. 7 is a partial longitudinal section, taken on the line 7—7, through Figs. 5, 6, 12, 13, 22, 23 and 24. It shows, in the underdrive mechanism, the clutch, the resilient means for engaging it, the sun gear in position for overcoming the resilient means and maintaining clutch disengagement and one of the weights for varying the resilient means. In the overdrive mechanism it shows the manually shiftable means for selecting backward or forward vehicle movement, the friction clutch and brake for rotating or stopping the overdrive sun gear, the construction of the overdrive planet pinion carrier and the driven or ring gear carrying member.

Figure 5:
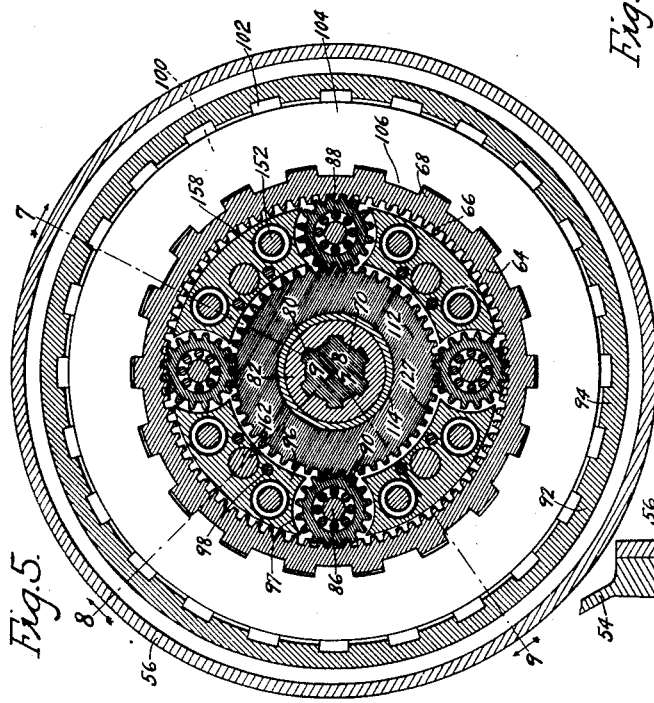
Fig. 5 is a transverse section taken through Fig. 1 at 5—5 showing the planetary underdrive gear-set surrounded by the plates of the underdrive clutch which prevents operation of the gears when it is engaged.

Fig. 8 is a partial section taken through Figs. 5 and 6 at 8—8, showing an underdrive weight in contact with the spring pressure plate and one of the pins for guiding the pressure plate in its axial movement.

Fig. 9 is a partial section taken through Figs. 5 and 6 at 9—9, showing the underdrive planet pinion carrier construction.

Fig. 10 shows diagrammatically the action of the underdrive centrifugal weights on the spring pressure plate. The innermost and outermost positions and four intermediate positions of a weight are shown with corresponding positions of a cam end of the weight. The table of figures gives the spring length for each position of the weight, the corresponding spring stress, and the R. P. M., at which the weights will furnish the said stresses through the several leverages shown.

Fig. 11 is a curve chart plotted from Fig. 10 showing the possible engine power at any speed and what portion of the possible power may be applied at a given speed when in direct drive without forcing the mechanism into gear drive. It also shows by comparison the difference in result obtainable when centrifugal force is applied through a constantly diminishing leverage as compared with direct application.

Fig. 12 is a transverse section taken at 12—12 of Fig. 1 showing part of the manually operable forward and reverse selective mechanism.

Fig. 13 is a transverse section taken at 13—13 of Fig. 1 through the centrifugal mechanism used in the overdrive gear-set showing the heavy springs which normally engage a clutch for keeping the overdrive gearing inoperative and the weights which fly outward and overcome the springs at a predetermined speed.

Fig. 14 shows one of the weights Fig. 13 after it has moved to the "clear out" position.

Fig. 15 shows a weight after it has been moved inwardly by a spring partway, to a position where clutch engagement begins.

Fig. 16 shows a weight after it has been moved inwardly by a spring a further distance, to a position where clutch engagement is complete.

Fig. 17 is a longitudinal partial section taken at 17—17 of Fig. 1 showing a part of the manually shiftable mechanism.

Fig. 18 shows the relation of parts of the manually shiftable mechanism when shifted for forward movement of the vehicle under one condition of operation.

Fig. 19 shows the relation of parts of the manually shiftable mechanism when shifted for forward movement under another condition of operation.

Fig. 20 shows the relation of parts of the manually shiftable mechanism when shifted for rearward movement under one condition of operation.

Fig. 21 shows the relation of parts of the manually shiftable mechanism when shifted for rearward movement under another condition of operation.

Fig. 22 is a transverse section taken at 22—22 of Fig. 1 through the shifting mechanism and the overdrive clutch and brake.

Fig. 23 is a transverse section taken at 23—23 of Fig. 1 through a part of the reversing mechanism.

Fig. 24 is a transverse section taken at 24—24 of Fig. 1 through the overdrive gearing and carrier.

Fig. 25 shows diagrammatically the overdrive clutch engaging cam in the engaged position.

Fig. 26 shows digrammatically the overdrive clutch engaging cam in the disengaged position.

A part designated by a given numeral in any one view will not be designated by a different numeral in any of the other views.

The fluid coupling and the underdrive gear mechanism herein shown is like that shown in my copending application Serial No. 59,879, filed January 20, 1936. Inasmuch as these portions are necessary to the present disclosure to provide a complete operative structure they are again described herein. The overdrive gear mechanism and the manually shiftable mechanism herein shown have not heretofore been disclosed. The entire mechanism will now be described with reference to the drawings.

The crank shaft 30 of an internal combustion engine carries a fluid coupling comprising the flywheel 32 to the outer face of which the cover 34 is secured by screws 36. The cover 34 carries the driving vanes 38 and a hub 40 having a bearing bushing 42 within which the driven element 50 rotates.

The driven element 44 carries the vanes 46 and the central hollow journal 48 upon which the driven member has rotative bearing. The journal 48 is internally splined to receive the externally splined drive shaft 50 of the underdrive gear-set. A ball bearing 52 is provided to take the thrust of the driven element 44. A flywheel cover 54 encloses the flywheel and coupling and supports the transmission housing.

The outer face of the cover 54 is closed by the end wall 55 which serves also as the front end closure of the transmission housing.

The forward portion of the transmission housing comprises integrally a large cylindrical part 56 and a similar cylindrical part 57 separated by a central partition 58. The rearward portion comprises a shell 60 and the ball bearing cap 62, the underdrive gear-set being contained in the space forward of the partition 58, and the overdrive gear-set and manually operable forward, neutral, and reverse mechanism being contained in the space rearward of the partition and in the rearward portion 60.

The transmission mechanism comprises three shafts all in axial alignment, a drive shaft, an intermediate shaft, and a driven shaft, the fluid coupling being mounted on the drive shaft, the underdrive gear-set on the intermediate shaft, and the remainder of the mechanism on the driven shaft.

Both of the gear-sets herein employed are of the planetary type which comprises a sun gear, several planet pinions surrounding it and meshing therewith, a carrier for supporting the planet pinions for both rotation upon their axes and revolution about the sun gear, and a ring gear surrounding and meshing with all of the planet pinions.

In the underdrive gear-set (see Figs. 1 to 11) the splined drive shaft 50 is rotatable in ball bearing 63 supported in the end wall 55. Drive shaft 50 has a flange 51 to which the ring gear 64 is secured by the rivets 53. Ring gear 64 has helical teeth 66 on the inside of the ring and external clutch teeth 68 on the outside, the gear teeth 66 being the driving means for gear drive and the clutch teeth 68 being the driving means for direct drive.

The intermediate shaft 70 is rotatable in roller bearing 72 supported in the end of the drive shaft 50, the other end of the shaft 70 being in turn supported by a roller bearing 74 rotatable in a cage 76 secured by rivets 78 to the center partition 58. The cage 76 is shown in detail in Fig. 3.

Driven shaft 70 has external splines 80 over which the internally splined hub 82 of the planet pinion carrier 84 fits snugly. The carrier 84 supports four circumferentially equally spaced bearing studs 86 having roller cages 88 upon which the planet pinions 90 rotate in mesh with the teeth 66 of the ring gear 64.

The driven friction clutch member 92 has internal clutch teeth 94 (see Figs. 1 and 5) and a forwardly extending hub 96 (see Figs. 8 and 9) which fits over the outer rim of the carrier 84 and is secured thereto by rivets 98, Fig. 9. The hub 96 is completely cut away at four places as at 97, Fig. 5, to admit the planet pinions 90. The four studs 86 have their outer ends secured in the member 92 whereby said studs have support at both ends.

A series of driven clutch plates 100 (see Fig. 5) have external teeth 102 fitting slidably between the internal teeth 94 of the member 92. A series of driving clutch plates 104 lie between the driven clutch plates and have internal teeth 106 fitting slidably between the external teeth 68 of the ring gear 64 (see Fig. 5). The outer driven clutch plates 108 are thicker than the remaining driven clutch plates 100. An internal spring ring 110 is sprung into a groove in the inside of the rim of the driven clutch member 92. This clutch may be called the underdrive clutch and may be broadly designated by the numeral 111.

The sun gear 112, shown in detail in Fig. 2, is rotatable on a bronze bearing bushing 114 which is press fitted over the outside of the internally splined carrier hub 82. An integral hub 116 extends rearwardly from the sun gear and is enlarged at 118 to provide a place for openings to contain the balls 120 and springs 122 (see Fig. 1). A band 124 surrounds the hub to retain the springs in place. The extreme rear end of the hub is formed to compose jaw clutch teeth 125.

Formed integrally around the hub portion 126 of the bearing cage 76 and extending forwardly (see Figs. 1 and 3) are the jaw clutch teeth 128 which correspond to and are engageable with the jaw clutch teeth 125 of the sun gear. The hub 126 extends into the space left between the inside diameter of the sun gear and the smaller end of the carrier hub 82.

The teeth 127 of the sun gear are helical and are at such an angle that any tangential load carried by the teeth creates an axial thrust in the proper direction to effect engagement of the jaw teeth 125 of the sun gear 112 with the jaw teeth 128 of the bearing cage 76.

Near the forward end of the hub 126 a round bottomed groove 129 extends completely around it. From this circular groove at equally spaced points around it the other round bottomed grooves extend rearwardly and somewhat helically, forming the guideways 130 within which the balls 120 act as followers which may move to carry the sun gear 112 rearwardly on the hub 126. The guideways 130 are slightly deeper at the rear end than they are where they join with the groove 129 so that the pressure on the balls creates a tendency to cause the gear to move rearwardly.

Fig. 1 shows the sun gear 112 when it is moved rearwardly as far as it will go with its jaw clutch teeth 125 fully meshed with the jaw clutch teeth 128 carried by the bearing cage 76, and with the balls 120 at the rearward and deepest end of the guideways 130. In this position the sun gear is held against backward rotation as it must necessarily be held to provide gear drive. The sun gear may, however, move forwardly on the hub 82 into the space 132 by drawing the balls 120 forwardly with it into the circular groove 129 whereupon the sun gear is free to rotate forwardly as it must during direct drive. The weight of the balls 120 and the strength of the springs 122 is preferably such that the centrifugal force of the balls becomes greater than the strength of the springs when the sun gear rotates as much as 600 R. P. M. This proportion will allow ample pressure on the balls inasmuch as the only time the balls need become operative as followers to press downward in the guideways and guide the jaw clutch into engagement is when the sun gear 112 has come to a dead stop and starts rotating backwardly.

The balls 120, therefore, never exert any friction on the groove 129 or the guideways 130 except for perhaps a fraction of a second each time the change from direct drive to gear drive and vice versa is taking place. As soon as the sun gear rotates forwardly in direct drive the balls raise up out of contact with the guideways and groove The guideways 130 are so located with respect to the teeth 128, and balls 120 are so located with respect to the teeth 125 that whenever the balls follow the helical paths the mating clutch teeth approach each other in proper relation for full depth engagement. This is important, for when a jaw clutch is employed and permitted to engage without such guiding means it frequently happens that the mating teeth engage with a very shallow hold thus throwing an excessive strain on the points of the teeth which results usually in the engaged teeth slipping off and creating a jerk in the carrying of the load.

The eight sector shaped centrifugal clutch operating weights 134 are each hinged by a pin 136 between a pair of ears 138 extending rearwardly from the friction clutch member 92. Two lateral projections 140 (see Figs. 6 and 7) extend from each weight 134 and rest upon the outer edges of the ears 138 and limit inward swinging of the weight on its hinge pin. Formed integral with each weight 134 at the back of the hinge is a cam 142 adapted to be operated by the swinging of the weight about its hinge pin. When the weights are swung to their innermost position, that is, with the projections 140 resting on the edges of the ears 138, the heel of the cam 142 rests on a spring pressure plate 146, (see Figs. 1, 7 and 8).

Slightly rearward of the spring pressure plate 146 is the clutch engaging spider 148 having eight radial arms 150 (see Fig. 6). Each arm 150 (see Fig. 7) has forwardly extending therefrom a clutch spring stud 152 and a clutch engaging stud 154. The clutch spring studs are secured in the spider 148 by riveting at 155 and are slidable through the spring pressure plate 156, the free ends having heads 157.

The clutch springs 158 are held in a substantial initial compression between the heads 157 and the spring pressure plate 146. The clutch engaging studs 154 are riveted at the rear end in the arms 150, the free end being slidable through openings in the driven clutch member 92. It will be seen that the stress of the springs constantly urges the weights to their "in" position and at the same time urges the clutch engaging studs 154 forwardly in a direction of clutch engagement. This forward movement is overcome and clutch engagement prevented only by rearward thrust of the helical sun gear when gear drive is in effect.

This rearward thrust acts through the clutch throwout bearing 160 which is held to the clutch engaging spider 148 by a sheet metal cap 161 (see Fig. 1) secured by rivets 163, thereby holding the clutch engaging spider 148 to its rearward position shown, whereby the clutch engaging studs 154 are held away from the clutch plates 100 and 104. The clutch is thus held in a fully disengaged position as long as gear drive is in effect.

In the drawings (see Fig. 7) the underdrive gear mechanism is shown in gear drive, in which case the clutch engaging studs 154 are drawn away from the clutch plate 108 leaving the space 109 into which the plates 100 and 104 may spread. The space 109 becomes wider as the clutch plates wear thinner but provision is made whereby the clutch engaging spider 148 may be moved enough farther by the springs 158 to compensate for such wear as may occur within the life of a motor vehicle whereby no manual clutch adjustment is ever required.

As the speed of the vehicle movement rises and falls the weights 134 move outwardly and inwardly thereby moving the spring pressure plate forwardly and rearwardly thus increasing and decreasing the stress of the springs 158. This changing in spring stress takes place with change in the rate of vehicle movement whether gear drive or direct drive is then in effect. But anytime during gear drive that the speed rises high enough to stress the springs an amount greater than the then existing load is thrusting the sun gear rearwardly, the clutch engaging spider is drawn forward against the sun gear resistance and direct drive will be established. To insure that the weights will move in and out simultaneously, the spring pressure plate is provided with four guide pins 162 (see Fig. 8) which are slidably fitted into openings 164 in the hub 96 of the driven clutch member 92. This prevents any one weight from moving outwardly ahead of the others and thereby creating an unbalanced effect.

In any speed-torque controlled transmission, gear-drive may be made effective below certain speeds by applying engine power sufficient to slip the direct drive clutch. Now inasmuch as the direct drive clutch is maintained in engagement by the force of the centrifugal weights which increase their force as the square of the vehicle speed, it follows that where weights are kept small enough to permit gear drive to be brought back into play at speeds above say 30 M. P. H., by application of full engine power, then only one-fourth full engine power may be applied at 15 M. P. H., without slipping the clutch and effecting gear drive.

It is, however, more desirable to provide a mechanism wherein gear drive may be brought into play at 30 M. P. H., by application of full engine power, but wherein at least two-thirds full engine power may be applied at 15 M. P. H., without reverting to gear drive. This is desirable to permit lower speeds to be effected in direct drive without having the mechanism shift into gear drive when only a reasonable amount of power is being applied.

Conversely it is desirable when in gear drive and acceleration has proceeded until 10 to 15 M. P. H., has been attained, to have the mechanism to change to direct drive at that speed, if the operator, by applying only moderate power, indicates no desire for maximum acceleration. But in conventional speed-torque mechanisms, there is far too little weight force at these low speeds to cause a shift to direct drive and the mechanism remains in gear drive even though only moderate power is being applied and direct drive would be more desirable.

In the underdrive mechanism herein shown the weights 134 are made large enough to provide the desired clutch engaging pressure when they are rotating at the lower speeds, then, in order to prevent these weights from applying too great a clutch engaging pressure at the higher speeds, the leverage through which the weights 134 act on the springs 158 is progressively decreased as the speed of rotation of the weights increase.

This result is obtained by first positioning the weights 134 with their centers of gravity considerably farther from the transmission axis than their hinge pins 136 when the weights are clear in, and second, by constructing the work arm in the form of the cam 142 the heel of which rests against the spring pressure plate 146 when the weights are clear in and the toe of which rests against the spring pressure plate when the weights are clear out.

Fig. 10 shows diagrammatically the movement of the center of gravity of a weight 134 and the corresponding movements of a cam 142. The point $a$ represents the center of gravity of a weight 134 when it is swung to the "in" position, the point $f$ represents the center of gravity when it is swung to the "out" position, and the points $b$, $c$, $d$ and $e$ represent intermediate positions. The points $g$, $h$, $i$, $j$ and $l$ represent the positions of the centers of the arcuate working face of the cam 142 corresponding to the several weight positions, that is, when the center of gravity of a weight is at $a$, the center of the arcuate face of the cam is at $g$; when the center of gravity of the weight is at $b$, the center of the arcuate face of the cam is at $h$ etc. The lines $m$, $n$, $o$, $p$, $q$ and $r$ represent the positions to which the spring pressure plate 146 has been moved when the center of the arc face of the cam has moved to position $g$, $h$, $i$, $j$, $k$ and $l$ respectively.

From the diagram it will be seen that when the center of gravity of a weight is at $a$ it is 3.797" from the transmission axis about which it rotates, and that it applies its centrifugal force to the spring pressure plate 146 through a lever the power arm of which is .730" and the work arm of which is .375" while when the center of gravity of the weight is, for instance, in the position $e$, it is 4.169" from the transmission axis about which it rotates, and it applies its centrifugal force to the spring pressure plate 146 through a lever the power arm of which is .285" and the work arm of which is 1.007". A given force applied by the weight to the spring pressure plate when the weight is clear out is only about 1/14 as effective as the same force would be if applied when the weight was clear in.

The columns of numerical values at the lower end of the diagram Fig. 10 give, from left to right, first, the movement of the spring compressing plate caused by weight movement to $b$, $c$, $d$, $e$ and $f$; 2nd, the length to which this movement compresses the springs if the mechanism is in direct drive; 3rd, the length to which the movement compresses the springs if the mechanism is in gear drive; 4th and 5th, the forces required to compress the springs to the lengths given in columns 2 and 3 respectively; and 6th and 7th, the R. P. M. which the weights must make about the transmission axis at their respective distances therefrom to create the required spring compressing forces through the leverage in effect at the respective positions.

The herein disclosed transmission should be used with a rear axle having a ratio of 4⅓ to 1, and with such ratio known a chart may be plotted showing the R. P. M. of the weights, the force generated thereby, the axial thrust of the underdrive sun gear under a given load, and the M. P. H., at which a shift from underdrive to direct will take place under a given load condition.

Fig. 11 is a curve chart wherein the curve $s$ is plotted from the numerical values in columns 5 and 7 in Fig. 10 and the curve $t$ is plotted from the numerical values found in columns 4 and 6. The curve $u$ is plotted to increase as the square of the R. P. M., and indicates the pounds force which centrifugal weights would apply to maintain clutch engagement if applied in the usual manner without changing the leverage through which the weights act. By curve $s$ it may be found that when the underdrive gear-set is in gear drive and the vehicle speed is 11½ M. P. H., the weights will be revolving 600 R. P. M., and will be stressing the springs with a force of about 120 pounds and that at this speed the engine must apply a force of as much as 60 out of a possible 170 foot pounds torque to the gears (see values at left of chart), in order to create a rearward sun gear thrust of 120 pounds and thereby maintain equilibrium.

It follows that if, at 11½ M. P. H., in gear drive, slightly less than 60 foot pounds torque is applied to the gearing by the engine, a shift up to direct drive will take place. By the lower curve $u$ it may be seen that the application of power to a conventional speed-torque mechanism would have to be reduced to something less than 6 foot pounds to compel the mechanism to remain in direct drive at 11½ M. P. H. The result is that, with conventional speed-torque mechanisms, a shift up to the direct drive connection would not likely ever be had at 11½ M. P. H., because of the great reduction in applied torque required to cause such a shift up. Such shift up might, however, be had at 11½ M. P. H., with conventional mechanism when driving on a considerable down grade.

The same curve s shows that if, when in gear drive, the vehicle is moving 29 M. P. H., the weights will be revolving 1500 R. P. M. and that the weights will have stressed the springs with a force of about 202 pounds and that the engine must apply a torque of as much as 101 out of a possible 170 foot pounds to create a rearward sun gear thrust of 202 pounds to maintain equilibrium and thereby maintain direct drive. It follows that at 29 M. P. H., in gear drive any reduction in applied torque to less than 101 foot pounds would bring the sun gear thrust to less than 202 pounds and permit the force of 202 pounds which was being applied to the springs by the weights to cause a shift up to direct drive.

Now the capacity of the underdrive clutch must be such that when it is engaged with a pressure of as much as 200 pounds (see values to right of chart) it will carry the maximum torque input for which the mechanism is designed, namely 170 foot pounds. By curve t it may be seen that if direct drive is in effect and the vehicle is moving 29 M. P. H., the weights will be revolving 1500 R. P. M. and stressing the springs with a force of 184 pounds and that in order to slip the clutch and bring in gear drive it will be necessary to apply about 157 foot pounds torque.

From the above it will be seen that, at a vehicle speed of 29 M. P. H., in gear drive a reduction in torque application to less than 101 foot pounds is necessary to cause a shift up to direct drive, but if the vehicle maintains this speed of 29 M. P. H., after it has changed to direct drive there must be applied a torque of 156 foot pounds to restore gear drive.

This overlap is provided so that too slight changes in torque application will not continually shift from gear drive to direct drive and vice versa and thereby cause undue clutch wear.

The curve v represents the maximum in foot pounds torque which may be delivered to the drive shaft 50 by a 90 H. P. engine at the various drive shaft speeds. By comparing the curve v with the curves s and t the percentage of maximum power which must be applied at any speed to prevent a change from gear drive to direct drive and which may be applied at any speed without causing a change from direct drive to gear drive may be seen.

From the curve v it may be seen that the maximum engine torque of 170 foot pounds may be applied to the drive shaft 50 when it is rotating as slowly as 450 R. P. M., which, in gear drive is at a vehicle speed of 5½ M. P. H. This is true, however, only where, as in this case, a fluid coupling is used to connect the engine to the drive shaft, because while the drive shaft may be rotating only 450 R. P. M., the engine, due to the slippage in the fluid coupling, has raced ahead to about 1900 R. P. M. at which speed the engine is able to deliver its maximum torque.

Had a friction clutch been employed instead of a fluid coupling, the maximum torque deliverable at 5 M. P. H., vehicle speed would have been about 132 foot pounds as seen by the dot and dash curve w. The curve w is plotted to indicate the torque deliverable by the engine to the shaft 50 when they are coupled together without slippage and are therefore rotating in unison.

This is the reason why, with a fluid coupling, the lowest gear speed may comprise an engine-to-wheel ratio of 7 to 1 while where a friction clutch is employed in the same situation, an engine-to-wheel ratio of as much as 11 to 1 is more desirable for the lowest gear speed.

The curve w then actually indicates the maximum torque of the engine when it revolves at the speeds indicated by the figures along the upper edge of the chart which are the speeds required when in gear drive to give the M. P. H., at the extreme bottom of the chart. When, however, the direct drive is in effect, the R. P. M. of shaft 50 for a given M. P. H., will be less, as indicated by the figures along the lower edge of the chart.

It is therefore necessary when consulting the chart to ascertain the maximum torque deliverable to shaft 50 when gear drive is in effect to follow the curve v through y, but when ascertaining the maximum torque deliverable to shaft 50 in direct drive to follow the curve v through x. This is true for the reason that y is plotted by the figures at the upper edge of the chart while x is plotted by the figures at the lower edge. By consideration of these curves it will be seen that the curve y, by the upper figures begins to fall at 2200 R. P. M. and x by the lower figures also begins to fall at this same speed, that is, the torque which the engine can deliver falls off after an engine R. P. M. of more than 2200 whether the mechanism is in gear drive or direct drive.

The intermediate shaft 70 which serves both as the driven shaft of the underdrive gear-set and the driving shaft of the overdrive gear-set has integral therewith at its rear end the plate 171. Different members and combinations of members are connected to or disconnected from the plate 171 to provide forward direct drive, forward overdrive, neutral, and reverse.

In a planetary gear train of the type shown comprising the three main elements, that is, the ring gear usually designated as R, the planet pinion carrier designated as C, and the sun gear designated as S, it is well known that:

(1) If S is held against rotation, R is made the driver and C is made the driven, as is the case in the underdrive gear-set hereinbefore described, a reduction in speed will be provided.

(2) That if S is held against rotation, C is made the driver and R the driven an increase in speed will be provided.

(3) That if any two members such as S and C are both made drivers while R is made the driven, a direct drive will be provided.

(4) That if C is held against rotation while S is made the driver and R the driven, R will rotate in the reverse direction.

(5) That if S only is made the driver while R is the driven and C is left wholly free, C will run idle slowly forward and no driving connection will be had between the driving and driven members.

The underdrive gear-set hereinbefore described employs the first of the above connections, while the mechanism now to be described makes all of the remaining connections, that is, 2 to 5, some manually, and some automatically, manual means being provided to elect between allowing the vehicle to stand still, moving it forwardly, or moving it rearwardly, while automatic means are provided to change from direct-forward to overdrive-forward and vice versa at predetermined speeds.

The driven shaft 166, carrying the direct drive, overdrive and reversing mechanism contained in the housing part 57 rearward of the partition 58 and in the shell 60 is rotatably supported at the front end in roller bearing 168 held in the end of the shaft 70.

At the rear end the shaft 166 has external splines 170. Closely fitted over these splines is an internally splined hub 172. Hub 172 is drawn against the shoulder 174 of the shaft by the screw 176 through intermediate members 178, 180, 182 and the ball bearing 184, which is the type capable of carrying radial load and axial thrust in both directions. The ball bearing 184 is held in place betwen the shell 60 and the ball bearing cap 62 by the screws 186.

Hub 172 has an outwardly extending flange 188 to the outward edge of which the ring gear 190 of the overdrive gear-set is secured by the rivets 192. The ring gear 190 therefore always rotates in unison with the driven shaft 166. The parts of the mechanism which surround the driven shaft, and rotate at different speeds, are rotatably held between the hub 172 and a flange 194 on the forward end of the shaft.

The overdrive planet pinion carrier has a long hub 196 having press fitted to its inside diameter a bearing bushing 198 which is runningly fitted over the shaft 166. The carrier 200 extends outwardly from the hub 196. Eight shoulder studs 202 are riveted to the face of the carrier 200. On four of these studs the four planet pinions 204 are rotatably supported, in mesh with the ring gear 190, on the roller bearings 206. A plate 208 is riveted to the outer ends of the studs 202 forming an outboard support for the studs. Clutch teeth 210 are formed on the periphery of the plate 208. These teeth are engaged by corresponding teeth 209 of a shifter fork 211 when it is desired to hold the carrier against rotation.

Forward of the carrier hub 196 is a long hub 212 having press fitted to its inside diameter a bearing bushing 214 which is runningly fitted over shaft 166. At the forward end of the hub 212 the carrier driving flange 216 extends outwardly. Flange 216 has clutch teeth 218 around its periphery which may be suitably engaged or disengaged for driving or releasing the carrier. The hubs 196 and 212 are end splined together at 220 whereby they are always made to rotate in unison.

The long hub 222 of the sun gear 224 has press fitted to its inside diameter the bearing bushing 226 which is runningly fitted over the carrier hub 196. A similar hub 228, having a bearing bushing 229, has extending outwardly therefrom the driving flange 230 which has clutch teeth 232 formed around its periphery. The teeth 232 may be engaged or disengaged by suitable means to drive or release the sun gear.

The hubs 222 and 228 are end splined together at 234 whereby they must always rotate in unison, but the end splines 234 are long enough to permit the sun gear 224 and its long hub 222 to have limited axial movement on the carrier hub 196. This axial movement operates the overdrive friction clutch and brake mechanism through which the sun gear 224 is driven for direct drive, or held against rotation for overdrive.

The overdrive friction clutch and brake mechanism comprises the driving friction clutch member 236, the driven friction clutch and brake member 238 and the stationary friction brake member 240. The driving friction clutch member 236 has teeth 242 around its periphery into which corresponding teeth of the friction clutch plates 244 extend. The driven friction clutch and brake member 238 has teeth 246 on its inner periphery into which corresponding teeth of the friction clutch plates 248 extend. The plates 248 extend into the spaces between the plates 244. There are nine plates 244 and nine plates 248 besides a heavier backing plate 249 and compression plate 251.

The driven friction clutch and brake member 238 has also the teeth 250 on its outer periphery into which corresponding teeth of the friction brake plates 252 extend. The stationary brake member 240 has the teeth 254 on its inner periphery into which corresponding teeth of the brake plates 256 extend. The plates 252 extend into the spaces between the plates 256 and there are nine plates 252 and nine plates 256 besides the heavier backing plate 257 and compression plate 259.

The stationary friction brake member 240 is held clamped between the housing 57 and the cap 60 by the screws 258 whereby it is always held against rotation. The driven friction clutch and brake member 238 is secured to a flange 260 extending outwardly from the sun gear 224 by the rivets 262. The driving clutch member 236 has press fitted to its internal diameter a bearing bushing 264 which is runningly fitted over the hubs 222 and 228.

Extending forwardly from the driving clutch member 236 are six jaws 266 (see Figs. 1 and 12), which fit closely into notches in the outer periphery of the plate 171 of the shaft 70, whereby the driving clutch member 236 and shaft 70 always rotate in unison. A shifting collar 268 is axially slidable over the outside of the jaws 266 by a shifter fork 270 extending into a groove 272 of the collar.

The collar 268 has six lugs 274 extending inwardly and slidably fitted between the jaws 266. The inner ends of the lugs 274 have internal teeth 276 which may upon axial movement of the collar, be meshed with either the teeth 218 or 232, whereby either the planet pinion carrier or the sun gear will be drivably connected to the shaft 70.

Extending outwardly from the driving clutch member 236 are six arms 278 (see Fig. 13). These arms each have a spring supporting lug 280 and a stop lug 282 at their outer ends and a hub 284 intermediate these lugs and the axis, all extending laterally and rearwardly from the arms.

Each arm 278 supports a centrifugal clutch operating weight 286. Each weight 286 comprises a relatively thin web portion 288 having two short shafts 290 and 292 extending laterally and forwardly. The one short shaft 290 is rotatably fitted into the hub 284 while the shaft 292 is surrounded by a bearing member 294.

In each lug 280 is a stud 296 (see Fig. 13) having a ball end 298. A spring holding washer 300 has a ball socket fitted over the ball end 298. Heavy coil springs 302 extend over portions of the washers 300 and bearing member 294. The bearing members 294 rest in the crotches 304 of the arms 278 whereby expansion of the springs is limited. A lug 306 extends laterally in both directions from the web 288. This lug seats against the stop lug 282 on the arm when the weight is rotated to its extreme outward position.

Each weight 286 has a segment having gear teeth 308 which are in constant mesh with the teeth of a gear 310. The expansive force of the springs 302 is applied to the short shaft 292 as to a side crank, thereby tending to rotate the weight about the other shaft 290, whereby the segment teeth 308 act on the gear 310 to impart limited rotation thereto upon rotation of the weight mass about the shaft 290. The rearward face of the gear 310 has cam lobes 312 formed thereon which engage corresponding cam lobes 313 formed on the forward face of the clutch backing plate 249 (see Figs. 1, 22, 25 and 26), whereby limited rotation of the gear 310 from the position shown in Figs. 1, 13, 22 and 25 to the position Fig. 26 allows the plate 249 to move forwardly and thereby allows the plates 249, 244 and 248 to spread apart to the disengaged position.

In a thickened part of the flange 260, a circular row of holes contain the springs 316. The ends of these springs rest in depressions in the thrust washer 318. Four studs 320 (see Figs. 7 and 23), compel the flange 260 and washer 318 to rotate together but permit axial movement therebetween. Springs 316 always urge the sun gear forwardly.

When rotation of the gear 310 by the weights 286 has removed the support from the backing plate 249 and permitted the plates 244 and 248 to spread apart, the sun gear 224 is thereby disconnected from the driving member 236. The springs 316 now expand and would follow up until the plates 244 and 248 were again pressed together were it not for the flange 319 of the driven friction clutch and brake member 238. But when the sun gear has moved forwardly about one-half the distance which rotation of the cam from the position Fig. 25 to the position Fig. 26 would permit, the flange 319 closes the space 321 and encounters the brake compression plate 259 whereby the plates 252 and 256 are compacted, this resulting in the sun gear 224 being held against rotation for overdrive.

A sheet metal plate 322 is secured to the edge of the member 240 by the rivets 324. This plate prevents rearward movement of the gear 310 and consequently of the driving clutch member 236. End thrust washers 326, 328, 330 and 334 are provided but are only operative as such for a few seconds when a shift from direct to overdrive, or from overdrive to direct is taking place.

The manually operable mechanism for shifting the fork 211 rearwardly from the neutral position shown in Fig. 1, and for shifting the fork 270 both forwardly and rearwardly from the neutral position there shown, is contained within the cover 336 which is secured to the housing 57 and cover 60 by the screws 337 (see Fig. 17), the fork 211 being provided with a longitudinal movable slide 338 and the fork 270 with a longitudinal movable slide 340.

The slide 340 has two thin spring supporting lugs 342 and 344 at the ends and two thicker spring supporting lugs 346 and 348 intermediate the ends.

The slide 338 has a thin spring supporting lug 350 at one end and the two thicker lugs 352 and 354 intermediate the ends (see Fig. 17).

Coaxial holes extend through lugs 342, 344, 346 and 348 and into these holes the spring thimbles 356, 358, 360 and 362 are slidably fitted. Similar thimbles 364 and 366 are slidable in holes in the lugs 350 and 354. Springs 368, 370 and 372 are held in the thimbles and are under considerable initial tension when the mechanism is in the neutral position shown in Figs. 1, 17, 22 and 23. The thicker lugs 346, 348, 352 and 354 have transverse slots 374, 376, 378 and 380 respectively.

Located between the thicker lugs 346 and 348 is the cam 382 rotatably supported by a short shaft 384 in the hub 386 of the cover 336. A short operating arm 388 is secured to the end of the shaft 384.

Located between the thicker lugs 352 and 354 (see Fig. 17), is the cam 390 rotatably supported by a short shaft 392 (see Fig. 22) in the hub 394 of the cover 336. Another short operating arm 396 is secured to the end of the shaft 392.

Operating arms 388 and 396 carry studs 398 and 400 respectively. An operating rod 402 having a T end 404 with holes for the studs is held in place by the washers 406 and pins 408. Any suitable dash control (non shown), may be provided for operating the rod 402 forwardly and rearwardly to rotate the cams 382 and 390.

Cam 382 has a thin part (see Fig. 22) which may, upon rotation of the cam counterclockwise or clockwise, enter the slots 374 and 376 respectively (see Fig. 17), and a thick part 412, which may not enter the slots and must therefore operate positively against the lugs 346 and 348.

Cam 390 also has a thin part 414 which may, upon rotation of the cam counterclockwise or clockwise, enter the slots 378 and 380 respectively, and a thick part 416 which may not enter the slots and must therefore operate positively against the lugs 352 and 354.

The thick part 412 of cam 382 is flattened at two places 418 and 420 while the thick part 416 of cam 390 is flattened at 422 only. Both cams are intended to be rotated away from the neutral position shown in Figs. 1 and 17, counterclockwise through an arc of sixty degrees as in Figs. 18 and 19, or clockwise through an equal arc as in Figs. 20 and 21.

Whenever the cams are rotated to the neutral position Fig. 17, the thick parts 412 and 416 of the cams 382 and 390 acting positively against the lugs 346, 348, 352 and 354, will always bring the slides 338 and 340 to their neutral position as shown in Figs. 1, 17, 22 and 23, whereby operation of the control means to neutral position always positively unmakes any driving connection then existing.

When, however, it is desired to move the slide 340 forwardly to mesh the teeth 276 with the teeth 218 for direct drive forward, and the teeth 276 are not then in alignment with the teeth 218, the thin cam lobe 410 enters the slot 374 (see Fig. 18), pushes the thimble 358 toward the thimble 356, thereby compressing the spring 368. The flattened side 418 now provides the space 424 into which the lug 348 may move if and when the spring 368 expands which will occur as soon as power is thereafter applied and the teeth 276 are slightly rotated with respect to the teeth 218. It will be noticed that operation of the mechanism from the position Fig. 17 to the position Fig. 18 for making direct drive forward connection does not permit the slide 338 to move. This is so arranged because, during direct drive forward, the fork 211 is preferably maintained in the neutral position.

When the control means is operated with a view of shifting both forks rearwardly to engage the teeth 276 with the teeth 232 and the teeth 209 (see Fig. 23) with the teeth 210 for making the reversing connection, and the teeth which are to be meshed are not so aligned as to permit meshing, the thin parts 410 and 414 of the cams will enter the slots 376 and 380, the spaces 426 and 428 will be opened and the springs 370 and 372 will be compressed as in Fig. 20. As soon thereafter as power is applied to alter the relative rotative position of the teeth which are to be meshed, the slides will move to the position shown in Fig. 21. It should be noticed that if all teeth which are to be meshed are properly aligned when the cams are thus shifted for the reversing connection, the slides will move to the position Fig. 21 simultaneously with the shift.

Furthermore, inasmuch as the slides are separately movable it may happen, when one set of the teeth are aligned and the other misaligned, that one slide will move simultaneously with the cam shift to the position in which it appears in Fig. 21 and the other remain in the position shown in Fig. 20 until power is applied. By this arrangement, the manual control means may always be set to the position desired whether rotation of the parts is taking place or not.

*Proportion*

While the transmission shown may be designed for an engine of any ordinary horsepower some indication of the proportion for a given horsepower may preferably be set forth.

With an engine of 85 to 90 H. P. at 3,200 to 4,200 R. P. M. and a total vehicle weight of around 2,600 to 2,900 pounds, the proportion of most of the parts may be gotten by taking the outside diameter of the driven clutch member 92 as 9 3/8" and making all other parts of the mechanism to the same scale. Some of the dimensions which may not readily be gotten by scaling the drawings are as follows:

The helix angle of the underdrive gear-set should be 23 degrees. The ring gear should have a pitch diameter of 5.432" and have 80 teeth; the sun gear a pitch diameter of 3.259" and have 48 teeth; and the planet pinions a pitch diameter of 1.086" and have 16 teeth.

The rule for ratio when the sun gear is held against rotation, the ring gear is the driver and the planet pinion carrier the driver is one revolution of the driven carrier C may be produced by $$\frac{R+S}{R}$$

revolutions of the driver R. The underdrive ring gear must therefore revolve $$\frac{80+48}{80}$$

equals 16/10 or 1.6 revolutions to produce one revolution of the carrier.

In planetary-gearing of the type herein employed the ratio available is confined within narrow limits, being always less than 2 to 1 and more than 1 to 1, the practical limit being reduced at about 1.75 to 1 for most and 1.25 to 1 for least reduction. A ratio of 2 to 1 would be obtainable only were it possible to make the diameter of the sun gear and ring gear equal, which would make the planet pinions zero diameter, while the ratio of 1 to 1 would be obtainable only were it possible to make the planets half the ring gear diameter which would require a sun gear of zero diameter.

The underdrive gear-set selected herein is therefore near the practical limit of reduction. This reduction would be insufficient if this gear-set were used with an ordinary flywheel friction clutch, but with the fluid coupling it is ample for the reason that the fluid coupling permits the engine to speed up to its best torque producing speed while the vehicle speed is still very low. The combination of this type of underdrive gear-set with a fluid coupling is therefore considered as a valuable feature of the invention.

The eight sector shaped weights 134 should together weigh about 2.62 lbs. exclusive of the hinge part. The springs 158 should be made of 0.08" round wire coiled 1/2" pitch diameter, each have 17 turns and a free length of 2.634".

The small springs 122 should be of 1/32" round wire coiled to 3/8" pitch diameter, having 4 turns and a free length of 1/2".

The helix angle of the overdrive gear set should also be 23 degrees. The ring gear should have a pitch diameter of 5.9752" and have 88 teeth; the sun gear a pitch diameter of 2.4444" and have 36 teeth; and the planet pinions a pitch diameter of 1.7654" and have 26 teeth. The helix angle of the sun gear should be right hand.

When reversing is to be done with a gear-set of this character, the sun gear is made the driver and the carrier is held against rotation, the ring gear being the driven member. The rule in this case is, one revolution of the sun gear produces S/R revolutions of the ring gear backwardly. The overdrive gear-set will then, when used for reversing, provide a reverse ratio of 36/88, that is, the sun gear must rotate 2.444 turns forwardly to rotate the ring gear one turn backwardly.

When the sun gear only is connected to the driving member and the ring gear is to be non-rotatable, and the carrier is left to rotate idly, as is the case when the herein described mechanism is in the neutral position shown in the drawings, the rule for ratio is, 1 revolution of the sun gear will produce $$\frac{S}{R+S}$$

revolutions of the carrier, that is, if the carrier is left loose, and the ring gear resists rotation, the carrier will idle slowly forward at $$\frac{36}{88+36}=\%_{31}$$

revolution to each revolution of the sun gear, that is, the sun gear must rotate 3.444 turns to cause the carrier to idle one turn.

When overdrive is to be made effective the sun gear is held against rotation while the planet pinion carrier is made the driver. The rule in such a case is, one revolution of the carrier produces $$\frac{R+S}{R}$$

revolutions of the ring gear. The overdrive then is $$\frac{88+36}{88}=3\%_{22}$$

that is, one revolution of the driving carrier will produce 1.409 revolutions of the driven ring gear.

A transmission mechanism proportioned as shown and used with power and vehicle weight indicated should be used in conjunction with a rear axle having a ratio of 4 1/3 to 1. This will provide engine-to-wheel ratios 7 to 1 for underdrive; 4 1/3 to 1 for direct drive; 3.075 to 1 for overdrive; and 10.6 to 1 for reverse, except when a heavy pull in reverse forces the underdrive gears to operate, in which case the reverse ratio will be 16.9 to 1.

The matter of the relative proportion of the clutch plates should be observed. The mechanism shown is proportioned for 170 foot pounds input. This 170 foot pounds, after being transmitted through the underdrive gears becomes 1.6×170 or 272 foot pounds at the plate 171. Now if the overdrive clutch and brake mechanism had to transmit the 272 foot pounds directly it would have to be of larger capacity than the underdrive clutch 111. But the overdrive clutch and brake mechanism is required only to either prevent the sun gear 224 rotating forwardly faster than the carrier 200 during direct drive, or to prevent it rotating forwardly at all during overdrive.

Now, if the vehicle were locked against movement, and the carrier 200 was driven forwardly with a force of 272 foot pounds, so as to force the sun gear 224 to revolve forwardly and thereby slip the overdrive clutch mechanism, the sun gear would have to revolve forwardly carrying the clutch plates 248 and brake plates 252 with it at a speed of $$\frac{R+S}{S} = \frac{88+36}{36} = 3\frac{1}{9}$$

revolutions of the sun gear forwardly to 1 revolution of the carrier. It follows that the capacity of the overdrive clutch and brake mechanism need be only of a size which would directly transmit 9/31 of 272 foot pounds or 79 foot pounds. This will account for the fact that the overdrive clutch and brake mechanism is smaller than the underdrive clutch mechanism although the power to be transmitted is 1.6 times as great in the overdrive.

The overdrive clutch and brake engaging springs 316 should be 12 in number, made of .041 inch diameter round wire, coiled to .375 inch pitch diameter, have 12 turns each, and each have a free length of 1.856 inches. These springs together apply less than 100 pounds to the clutch plates which is sufficient clutch engaging pressure only for keeping the clutch engaged when the vehicle is driving the engine, or when the power applied is about one-third the maximum. But the forward axial thrust of the sun gear 224, due to its helical teeth, is about three times that of the springs 316 whereby the clutch or brake engaging force is always in proportion and more than sufficient to transmit any power up to 170 foot pounds.

The sun gear 224 has helical teeth primarily for quiet running, and its axial thrust is a necessary result of the helix angle. The angle of the helix is therefore made right hand so that the axial thrust assists instead of hinders the springs.

The springs may however, be made strong enough if desired to themselves provide enough clutch or brake engaging pressure without assistance from the gear thrust.

It should also be noticed that when the sun gear 224 becomes the driver, as when reversing is being done, and its axial thrust is therefore rearward, the overdrive clutch and brake mechanism is drawn open against the springs 316, and the sun gear then depends, for its driving connection, wholly on the teeth 276 being meshed with the teeth 232.

The heavy coil springs 302 which oppose the centrifugal force of the overdrive weights 286 are six in number, made of .125 inch round wire, coiled ⅝" pitch diameter, have 14 turns each and a free length of 3.632 inches.

The small shifter springs 368, 370, 372 are three in number, made of .041 inch round wire, coiled 7/16" pitch diameter, have 18 turns and a free length of 2.601".

Operation

The operation of the mechanism is as follows:
The manually operable clutch control means should preferably first be placed in the neutral position which will set the shifting cams 382 and 390 as in Figs. 1 and 17 and the shifting forks 211 and 270 as in Fig. 1. In this position the carrier 200 is free to rotate idly. The underdrive clutch 111 and the portion of the overdrive clutch and brake mechanism represented by the plates 244 and 248 being drivably engaged, the sun gear 224 is thereby connected to rotate at the same speed as the shafts 50 and 70.

In this state the engine may be started and operated at any speed desired without moving the vehicle, because the rotating sun gear 224 and the nonrotating ring gear 190 will cause the carrier 200 to rotate idly forward at .29 the speed of the shaft 50. This slow relative rotation of the gears under no load insures that no gear noise will be had when the device is in neutral.

The manual control means may next be operated to set the cams 382 and 390 in the position shown in Figs. 20 and 21.

If, when so operated, the teeth 209 and 210 are aligned and the teeth 232 and 276 are aligned, then both slides 338 and 340 will move simultaneously with movement of the cams as in Fig. 21 to engage the teeth, but if either set of teeth is misaligned then the movement of that slide will be held as in Fig. 20 until rotation of the parts has begun. In either event the teeth 209 will engage the teeth 210 and the teeth 276 will engage the teeth 232 and the reversing connection will be made, that is, the sun gear 224 is connected to shaft 70 and the carrier 200 is held against rotation.

The engine may now be accelerated sufficiently to cause the shaft 50 to be rotated by the engine through the fluid coupling whereby the sun gear 224 is revolved. Forward rotation of the sun gear 224 now rotates the ring gear 190 backwardly, the engine-to-wheel ratio being 10.6 to 1. If, however, while this reversing connection is thus made, the vehicle encounters considerable resistance to backward movement, the underdrive gear set will be drawn into use and the engine-to-wheel ratio will be 16.9 to 1.

The manual control means may next be operated to set the cams 382 and 390 in the position shown in Figs. 18 and 19. If, when so set, the teeth 276 and 218 happen to be in proper alignment for meshing, then the slide 340 will, simultaneously with the movement of the cams, slide from the position Fig. 18 to the position Fig. 19. If, however, the teeth 276 and 218 are not thus aligned, the spring 368 will be compressed, the space 424 will be created, and meshing of the teeth 276 with the teeth 218 will be deferred until power is applied to cause relative rotation of the teeth 276 and 218.

In either event, when the teeth are meshed and power is applied, the carrier 200 will be rotated at the speed of the shaft 70, and, since the sun gear is also directly connected to the shaft 70 through the clutch plates 244 and 248, the entire mechanism rearward of the partition 58 must rotate in unison, that is, the direct drive connection is now in effect. The 4⅓ axle ratio now provides an engine-to-wheel ratio of 4⅓ to 1.

At any speed now, while direct drive connection is thus made, that the operator applies to the shaft 50 a torque having a value for that speed, which is above the curve t, Fig. 11, he will slip the clutch 111 and thereby force the underdrive gear-set to become effective, that is, at 10 M. P. H., he may not apply more than 80 foot pounds (see foot pound values at right of Fig. 11), or at 20 M. P. H., he may not apply over 125 foot pounds without slipping the clutch and thereby bringing the underdrive into play. After 34 M. P. H., he may apply the maximum of 170 foot pounds without slipping the clutch and reverting from direct to underdrive.

Since the clutch 111 is, normally engaged, the sun gear 112 is rotated forwardly by the ring gear 64 and planet pinions 90 at the same speed as the clutch. But as soon as a torque is applied to the clutch 111 of sufficient value to slip it against the clutch engaging force provided by the weights 134, which is governed by the then existing vehicle speed, the sun gear instantly starts to rotate at less R. P. M. than the clutch. When the clutch slips an amount which permits the ring gear 64 to revolve 1.6 times as fast as the carrier 84, the sun gear will have been brought to a non-rotative state.

At the slightest increase in slip of clutch 111, the sun gear 112 starts to rotate backwardly, whereupon the helical teeth 127 which up to now drew it axially forward into the space 132 now starts it axially rearward. As this occurs the helical teeth 127, the balls 120 and guideways 130 and the jaw clutch teeth 125 and 128 all cooperate to move the sun gear rearwardly and guide the jaw teeth 125 and 128 into correct engagement.

When the jaw teeth engage and the gear load is taken up, the jaw teeth are forced by the load acting on the helical teeth to full depth engagement and thereby, through the thrust bearing 160, fully disengage the clutch 111 so that there will be no partial engagement and consequent drag.

Anytime and at any speed the operator may release the accelerator sufficiently to cause the rearward load created thrust to be less than the forward weight created thrust and thus allow the sun gear to move axially forward about ⅛".

This does not instantly change from underdrive to direct drive because when the sun gear has been pushed forwardly about ⅛", the studs 154 press the friction clutch discs 100 and 104 together. The jaw clutch teeth 125 and 128 being about ¼" long are not out of mesh and therefore momentarily continue the gear drive in effect. But the friction between the rubbing clutch discs although not great at the first touch, nevertheless takes some of the load off of the gearing.

When it takes some of the load off of the gearing the rearward thrust on the sun gear 112 is just that much less, and being less permits more of the clutch engaging pressure of the springs 158 to be applied to the discs, which, rubbing harder, takes more load off of the gearing. This is repeated over a period of several seconds whereupon enough of the spring pressure is applied to the discs to allow the driving discs 104 to revolve more nearly at the same speed as the driven discs 100 than the ratio of 1.6 to 1 of the gears whereupon all of the load is removed from the sun gear 112 and it is rotated clockwise.

As soon as this occurs, the jaw teeth 125 and 128, the guideways 130 and the helical teeth 127 all cooperate to move the sun gear forwardly and completely disengage the jaw teeth. The helical teeth alone will keep them disengaged as long as the sun gear 112 rotates forwardly, which is as long as direct drive is in effect.

Instantly the sun gear rotates forwardly, if the speed has been raised to as much as 10 M. P. H., the followers 120, which have been pressing downwardly in the groove 129 and guideways 130 while the sun gear was non-rotative, now rise against the springs and remove the friction between the followers and the guideways and groove.

It is, however, possible to start from zero M. P. H., and accelerate the vehicle to a high speed without bringing the underdrive gearing in at all, but the torque applied in such a case to shaft 50 at zero M. P. H. would have to be so low that acceleration would be very slow.

In starting from a dead stop, therefore, the operator will almost invariably apply enough torque to bring in the underdrive gearing. In sections where 15 M. P. H., is the limit of speed, some drivers, in starting from a dead stop may apply maximum torque as indicated by the curve v, Fig. 11, and thereby bring in the underdrive gearing, then accelerate by maximum torque to 15 M. P. H., then reduce the torque to 110 foot pounds or less which would cause a change to direct drive, and thereafter so regulate the applied torque as to keep down to 15 M. P. H., until another stop was required.

In sections where no speed limit is imposed, the driver, starting from a dead stop, may apply full torque as indicated by the curve v to bring in the underdrive gearing, then keep the torque at the highest possible value. After a speed of 2200 R. P. M. of the engine, the maximum torque will decrease as seen in the curve y. At 3840 R. P. M. of the engine or 46 M. P. H., in underdrive the torque will have fallen off from 170 to 122 foot pounds.

This 122 foot pounds creates a sun gear thrust of 240 pounds tending to maintain underdrive in effect, (see values at left of Fig. 11). By reference to curve s it will be seen that 3840 R. P. M., or 46 M. P. H., in underdrive the weights 134 have energized the springs 158 to such an extent that they are providing 240 pounds force tending to engage the clutch 111. Any slight increase in speed above 46 M. P. H., in underdrive, will force a shift to direct drive.

It will therefore be seen that a driver may, in starting from a dead stop, accelerate to a high speed without using underdrive if given sufficient time; he may accelerate to 10 to 15 M. P. H., in underdrive then shift to direct by lowering his applied torque; he may then continue at this speed in direct or accelerate from there upward in direct; or he may by applying maximum torque steadily, accelerate to 46 M. P. H., in underdrive. He cannot, however, maintain underdrive above 46 M. P. H., which is a desirable limitation to prevent engine racing.

It will also be seen that should the operator be driving, say 20 M. P. H., in direct drive, and desire to change his speed to 46 M. P. H., as soon as possible, he could, by applying torque in excess of 125 foot pounds change to underdrive, then accelerate to 46 M. P. H., in underdrive whereupon the shift to direct would take place.

If, however, the vehicle is once moving at a speed of as much as 34 M. P. H., in direct drive, no return to underdrive may be effected except by lowering the speed, because at 34 M. P. H., in direct drive, the weights 134 will energize the springs 158 with a clutch engaging force of 200 pounds (see curve t), and clutch 111 is so designed that when it is held engaged with a force of 200 pounds it will carry the maximum torque of 170 foot pounds (see values at right of Fig. 11). The operator may, therefore, voluntarily bring in underdrive at any speed under 34 M. P. H., and may maintain it up to any speed not to exceed 46 M. P. H. The engine speed of 3840 R. P. M. necessary to bring the vehicle speed to 46 M. P. H., in underdrive is not injurious inasmuch as engines of this class have an operating range up to 5000 R. P. M. When the direct drive clutch 111 engages at 46 M. P. H., the engine will drop in speed from 3840 to 2400 R. P. M. (see values at top and bottom of Fig. 11).

Having thus employed underdrive to overcome unusual resistance, as in accelerating the vehicle, or in climbing an unusual hill, the operator will maintain direct drive for all ordinary driving.

But with the 4⅓ to 1 axle ratio indicated as suitable for use with the herein described mechanism, the engine would, if direct drive was maintained, again be revolving 2600 R. P. M. when a speed of 50 M. P. H., was reached, 2860 R. P. M. at 55 M. P. H., 3120 R. P. M. at 60 M. P. H., 3640 R. P. M. at 70 M. P. H., 4160 R. P. M. at 80 M. P. H., and 4680 R. P. M. at 90 M. P. H. The latter engine speeds are within the possible range but are maintained only at considerably lowered efficiency.

It is therefore desirable, to so arrange the mechanism that, after a speed of 55 M. P. H., is exceeded, that is, after the engine is rotating 2860 R. P. M., it will automatically shift to overdrive. When so shifted the engine speed will drop from 2860 R. P. M. to 2030 R. P. M. and its speed at 90 M. P. H., in overdrive would be only 3320 R. P. M.

The operation of the mechanism which shifts up to overdrive when the speed exceeds 55 M. P. H., and which shifts back to direct drive when the speed again drops below 50 M. P. H., may best be understood from Figs. 13 to 16, 25 and 26. In Fig. 13 the springs 302 are expanded to maximum, thereby seating the members 294 in the crotches 304 and holding the weights 286 to their "clear in" position. In this position the springs are under an initial stress of 83 pounds each, and at 55 M. P. H., the weights, the center of gravity of which is at the point 430, each exert an outward force along the line 432 of 173 pounds each. But the leverage through which the 173 pound weight force must overcome the 83 pound spring force is $$\frac{.37}{.77}$$

and $$\frac{173 \times .37}{.77} = 83 \text{ pounds}$$

Therefore at 55 M. P. H., the spring and weight forces are in equilibrium.

When therefore, the speed of 55 M. P. H., is exceeded the weights move outwardly through an arc of 82½ degrees and thereby rotate the gear 310 through an arc of 55 degrees and turn the cam lobes 312 in the direction of the arrow 434, Fig. 25, until the lugs 306 strike the stops 282 as in Fig. 14, whereupon the clutch plates 244 and 248 spread apart, and the cam lobes arrange themselves as in Fig. 26.

While this is taking place the springs 316 expand until the space 321 is closed and the flange 319 encounters the compression plate 259 whereby the sun gear 224 is now held against rotation for overdrive, the pressure between the brake plates 252 and 256 being always about 80 pounds due to the springs 316 with additional pressure caused by the thrust of the sun gear 224, which may vary from nothing to several hundred pounds depending on the power being transmitted.

Now in common practice, in automatic transmission mechanisms, the centrifugal clutch operating weights are placed on the driven member, because, when they fly out and engage a clutch and thereby greatly reduce the engine speed, the speed of the driven member and consequently of the weights remains the same whereby the weights remain out until a reduction in vehicle speed takes place.

But in the present invention, for the purpose of simplifying the structure, the centrifugal weights are arranged to be rotated by the driving member. The consequence is, when, at 55 M. P. H., the weights fly out and arrange themselves as in Fig. 14, and thereby bring in overdrive, the rotative speed of the weights is thereby instantly reduced from 2860 to 2030 R. P. M. without change in vehicle speed, whereby the outward force of a weight along the line 436 is reduced from 173 pounds to 107 pounds.

If, now the springs 302 which urge the weights inwardly, and which now have a force of 171 pounds each, were arranged as in common practice, the springs would immediately return the weights, so that as fast as the weights would move out, their reduction in rotative speed, due to their moving out would instantly cause them to move back in.

But by Fig. 14 it may be seen that although in the "out" position the spring strength has increased from 83 to 171 pounds and the weight force, due to its rotative speed reduction, has decreased from 173 to 107 pounds, the weights nevertheless remain out because the force of the spring is now applied as to a crank which is nearly on dead center, the equivalent leverage through which the weight, in its "out" position, retains the spring being now $$\frac{.36}{.186}$$

instead of $$\frac{.37}{.77}$$

as it was in the "in" position Fig. 13.

When, however, the vehicle speed falls to 50 M. P. H., at which time the weights (Fig. 14) are revolving 1845 R. P. M. and the outward weight force along the line 436 falls to 88 pounds, the 171 pound spring force acting through the equivalent leverage of $$\frac{.186}{.36}$$

produces just $$\frac{.186}{.36} \times 171 \text{ pounds} = 88 \text{ pounds}$$

and the spring and weight forces again just balance. Any further reduction in vehicle speed below 50 M. P. H., will cause the weights to move in and thereby shift back to direct drive.

Now, if, at the time the weights start in, the maximum torque of 170 foot pounds is being transmitted, the axial thrust of the sun gear 224 and the force of the small springs 316 together will be about 281 pounds. But by so designing the cam lobes 312 and 313 that the weights move in to the position Fig. 15 before it begins to overcome this 281 pounds, the spring will be acting on the weight through the improved leverage of $$\frac{.71}{.48}$$

The outward force of a weight along the line 438 is now (at 50 M. P. H.) only 80½ pounds. To balance this 80½ pounds through a leverage of $$\frac{.71}{.48}$$

would take a spring force of $$\frac{.48}{.71} \times 80\frac{1}{2} = 55 \text{ pounds}$$

But there is in Fig. 15 a spring force of 143 pounds. The difference 143—55, or 88 pounds per spring or a total of 528 pounds will be used in compacting the clutch plates 244 and 248 against the resistance of 281 pounds above stated, but the spring force of 528 pounds acts through a distance of .31 inch to move the sun gear .125". The 528 pounds will therefore balance a sun gear resistance of $$\frac{.31}{.125} \times 528 = 1310 \text{ pounds}$$

It will be seen that, even when the maximum power is being transmitted, there is this ample force of 1310—281 or 1029 pounds available for forcing the sun gear 224 rearward and thereby opening the gap 321 thereby relieving the brake plates 252 and 256 and compacting the clutch plates 244 and 248 thereby changing from overdrive back to direct drive.

Fig. 16 shows the condition of the several parts when the clutch plates 244 and 248 are fully compacted. Here the spring is weaker but by calculation it may be found that the further improved leverage shown compensates for the decrease in spring strength. For this reason the forces which engage the direct drive clutch mechanism are substantially constant from the time engagement begins until it is completed.

The underdrive gear mechanism forward of the partition 58 Fig. 1, being identical with that shown in my copending application Serial No. 59,879, filed January 20, 1936, is not herein claimed, the novelty being contained in the mechanism rearward of partition 58.

I claim:

1. Transmission mechanism comprising, a driving member, a driven member, a driven gear on the driven member, a sun gear, a planet pinion drivably connecting the driven gear and the sun gear, a planet pinion carrier, means connecting the carrier to the driving member, clutch means on the driving member, a nonrotatable brake means, and brake means on the sun gear adapted to be moved to engage either the driving member clutch means or the brake means, and a speed responsive means on the driving member operative at a predetermined speed to withdraw the driving member clutch means from reach of the sun gear clutch means whereby the said sun gear brake means may engage the said stationary brake means.

2. Transmission mechanism comprising, a driving member, a driven member, a driven gear on the driven member, a sun gear, a planet pinion drivably connecting the driven gear and the sun gear, a planet pinion carrier, means connecting the carrier to the driving member, clutch means on the driving member, a stationary brake means, clutch and brake engaging means on the sun gear, means urging the sun gear axially to engage its clutch and brake engaging means with the clutch means or the brake means, means for holding the driving member clutch means in a position which is nearer the sun gear clutch and brake engaging means than the position of the stationary brake means, whereby the sun gear clutch engaging means normally engages the driving member clutch means, and means for withdrawing said holding means whereby the sun gear brake engaging means may engage the stationary brake means.

3. The structure defined in claim 2 in which the means urging the sun gear axially is a spring means.

4. The structure defined in claim 2 in which the sun gear has helical teeth and in which the means urging the sun gear axially is the thrust caused by the load carried by the helical teeth.

5. The structure defined in claim 2 in which the sun gear has helical teeth and in which the means urging the sun gear axially comprises a spring means supplemented by the thrust caused by the load on the helical teeth.

6. Transmission mechanism comprising, a driving member, a driven member, a driven gear on the driven member, a sun gear, a planet pinion drivably connecting the driven gear and the sun gear, a planet pinion carrier, means connecting the carrier to the driving member, a driving member clutch means, a stationary brake means, a sun gear clutch and brake engaging means, means urging the sun gear clutch and brake engaging means axially toward the driving member clutch means and stationary brake means, means on the driving member holding said driving member clutch means axially in advance of the stationary brake means, whereby the sun gear clutch engaging means may engage said driving member clutch means first, and a speed responsive means on the driving member operative at a predetermined speed to withdraw the said holding means and thereby permit the driving member clutch means to move axially away from the sun gear clutch engaging means whereby the sun gear brake engaging means engages the stationary brake means.

7. Transmission mechanism comprising, a driving member, a driven member, a ring gear on the driven member, a sun gear, a planet pinion in mesh with both the ring gear and the sun gear, a planet pinion carrier, means connecting the carrier to the driving member, a friction clutch element on the driving member, a stationary friction brake element, friction clutch engaging means and friction brake engaging means on the sun gear, means urging said sun gear engaging means axially into engagement with either of said elements, means on the driving member for holding the driving member friction clutch element axially in advance of the stationary friction brake element whereby the sun gear friction clutch engaging means engages it first, and centrifugal means on the driving member operative at a predetermined driving member speed to withdraw said holding means, whereby the sun gear friction brake engaging means will engage the stationary friction brake element.

8. Transmission mechanism comprising, a driving member, a driven member, a clutch for connecting said members, gearing for connecting said members independently of the clutch upon disengagement thereof, a centrifugal weight for controlling the clutch hinged on the driving member and having its center of gravity so positioned that outward movement of said center rotates said weight about said hinge, a crank positioned on said weight, a spring having one end operatively connected to said crank and the other end to said driving member, said crank and spring being so positioned that when the weight is in the "in"

position and the spring is expanded, the force of the spring is applied to the crank when the crank is near the quarter, and when the weight is in the "out" position and the spring is compressed, the force of the spring is applied to the crank when the crank is nearer but still somewhat away from dead center, and means whereby rotation of the weight about its hinge in one or the other direction engages or disengages said clutch.

9. Transmission mechanism comprising, a driving member, a driven member, a driven gear on the driven member, a sun gear, a planet pinion in mesh with said driven gear and said sun gear, a planet pinion carrier, a clutch element on the driving member, a stationary brake element, a clutch and brake element on the sun gear operative respectively to be connected to either the driving clutch element or the stationary brake element, a centrifugal weight on the driving member, means operative by outward movement of said weight for disconnecting the driving clutch element from the sun gear clutch element and connecting the sun gear brake element to the stationary brake element, a spring for urging said weight inwardly, leverage means connecting said weight and spring whereby the force of the spring to return the weight becomes progressively less as the spring becomes stronger, and manual means shiftable for connecting or disconnecting said carrier to said driving member.

10. In transmission mechanism having toothed members, one axially slidable to move its teeth into or out of engagement with the teeth of the other, a manually movable cam having one lobe adapted to act positively to shift said teeth out of engagement, a second lobe, and a resilient means interposed between said second lobe and said shiftable toothed member whereby said cam may be actuated to the engaged position when said teeth are misaligned.

11. In a transmission mechanism, a driving member, a driven member, a driven gear on the driven member, a sun gear, a planet pinion in mesh with the sun gear and driven gear, a planet pinion carrier, a toothed member rotatable with the driving member shiftable axially in one direction into a toothed member on the carrier, and axially in the other direction into a toothed member on the sun gear, a non-rotatable toothed member shiftable axially into a second toothed member on the carrier, manual means shiftable positively to shift the several toothed members out of mesh with each other and shiftable resiliently to shift the said several toothed members into mesh with each other, whereby the manual shift to the meshed position may be made when the teeth to be meshed are misaligned.

12. Transmission mechanism comprising, a driving member, a driven member, gearing, a gear connecting element engageable for connecting said members through said gearing, means including a direct connecting element operative upon engagement thereof to connect said members directly, an axially movable connecting element carrying means engageable with the gear connecting element and means engageable with the direct connecting element for completing gear connection and direct connection respectively, means for moving said axially movable element axially, means for holding the gear connecting and direct connecting elements so that one is axially closer to the axially movable element than the other, whereby the axially movable element engages the closer element first, and means for withdrawing the said closer element beyond the reach of the axially movable element whereby said axially movable element may be moved to engage the other connecting element.

13. In transmission mechanism, two toothed clutch members, a toothed clutch member shiftable axially out of mesh with one and into mesh with the other of the said two toothed clutch members, a manual means for shifting said axially shiftable toothed clutch member, positively acting means associated with said manual means for shifting said shiftable toothed clutch member out of mesh with either of the said two toothed clutch members, and yieldable means associated with said manual means for shifting said shiftable toothed clutch member into mesh with either of said two toothed clutch members, whereby said manual means may be moved to the shifted position when the teeth to be meshed are misaligned.

14. Transmission mechanism comprising a housing, a driving member, a driven member, a gear on the driven member, a sun gear, a planet pinion in mesh with both the driven member gear and the sun gear, a planet pinion carrier, means connecting said carrier to the driving member, clutching means rotatable by the driving member, braking means surrounding said clutching means and secured against rotation by said housing, clutch and brake means carried by the sun gear and movable axially toward or away from the said driving member clutching means and said braking means, and means for supporting the said driving member clutch means in two axially spaced positions, one forward of and the other rearward of the braking means with respect to the sun gear clutch and brake means.

15. The structure defined in claim 14 in which the means for moving the driving member clutch element axially is a cylindrical cam rotatable on the driving member.

16. The structure defined in claim 14 in which the means for moving the driving member clutching means axially is a cylindrical cam rotatable by centrifugal weights on the driving member.

17. The combination, in transmission gearing, of a driving member, a driven member, a gear on the driven member, a planet pinion in mesh with said gear, a sun gear in mesh with said planet pinion, a planet pinion carrier, means for connecting said carrier to the driving member, means for holding said carrier against rotation, means for holding the sun gear against rotation, a friction clutch for connecting the sun gear to the driving member operative to be engaged by axial movement of the sun gear in one direction and disengaged by axial movement of the sun gear in the other direction, helical teeth on the sun gear angled to move said sun gear in one direction to engage said friction clutch when the carrier is connected to the driving member and torque is transmitted, and in the other direction to disengage said friction clutch when the carrier is held against rotation and torque is transmitted, and a second sun gear clutch for connecting the sun gear to the driving member when said sun gear is operative to disengage said friction clutch.

18. The structure defined in claim 17 in which the said second sun gear clutch is a toothed clutch.

19. The structure defined in claim 17 in which there is a selective means operable in one direction to connect the carrier to the driving member and in the other direction to engage the second sun gear clutch and hold the carrier against rotation.

20. In a transmission mechanism, a driving member, a driven member, a ring gear on the driven member, planet pinions in mesh with said ring gear, a sun gear in mesh with said planet pinions, a planet pinion carrier, manual means for selectively connecting the carrier to the driving member whereby forward rotation of the driving member urges the sun gear to rotate forwardly faster than the driving member, a clutch connecting the sun gear to the driving member to prevent said forward rotation, helical teeth on said sun gear so angled as to thrust said sun gear axially in a direction which urges the said clutch to the engaged position whenever said sun gear is being urged to rotate forwardly by connection of the carrier to the driving member, means to hold said carrier non-rotative whereby forward rotation of said sun gear through said clutch creates an axial thrust which tends to disengage said clutch, and manual means to selectively connect said sun gear to said driving member otherwise than through said clutch when said carrier is being held non-rotative.

21. Transmission mechanism comprising, a driving member, a power unit for applying a driving force to said driving member, a driven member, a clutch connecting said members for rotation at the same speed, resilient means under stress maintaining engagement of said clutch, a speed responsive means on the driving member for controlling said resilient means, operative to disengage said clutch at a predetermined speed whether said driving force is released or not, speed increasing gearing for connecting said driving and driven members independently of the clutch upon disengagement thereof, and means for connecting said members thru said gearing.

22. Transmission mechanism comprising, a driving member, power means applicable to the driving member, a driven member, a clutch connecting said members for rotation at the same speed, resilient means on the driving member holding said clutch in the engaged position, a speed responsive means on the driving member operative to overcome said resilient means and disengage said clutch at a predetermined speed irrespective of whether the power being applied to the driving member is released or not, speed increasing gearing for connecting said members independently of the clutch upon disengagement thereof, and means operative upon clutch disengagement for drivably connecting said members thru said gearing.

23. In a change speed gearing, the combination of a drive shaft, power means for applying a driving force to the drive shaft, a driven shaft, change speed planetary gearing between said shafts including a sun gear, an orbit gear connected to the driven shaft, a planetary carrier and its pinion meshing with said sun and orbit gears, and speed controlled mechanism, operative at a given speed whether said driving force is released or not, to either connect said sun gear to revolve with said carrier or to control the sun gear rotation.

24. In a change speed gearing, the combination of a drive shaft, means to apply torque to said drive shaft, a driven shaft, a change speed planetary gearing between said shafts including a sun gear, an orbit gear connected to the driven shaft, a planetary carrier and its pinion meshing with said sun and orbit gears, compressible clutch and brake means for either connecting said sun gear to revolve with said carrier or hold said sun gear against rotation, and means adapted to operate said clutch and brake means at a definite speed whether the torque being applied to the drive shaft is released or not.

FREDERICK W. COTTERMAN.

CERTIFICATE OF CORRECTION.

Patent No. 2,201,848.  May 21, 1940.

FREDERICK W. COTTERMAN.

It is hereby certified that error appears in the printed specification of the above numbered patent requiring correction as follows: Page 13, first column, line 52, claim 1, before "and" insert the word --clutch--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.